May 10, 1949. F. J. WALLACE 2,469,906
URETHRAL DILATOR
Filed June 12, 1946 2 Sheets-Sheet 2
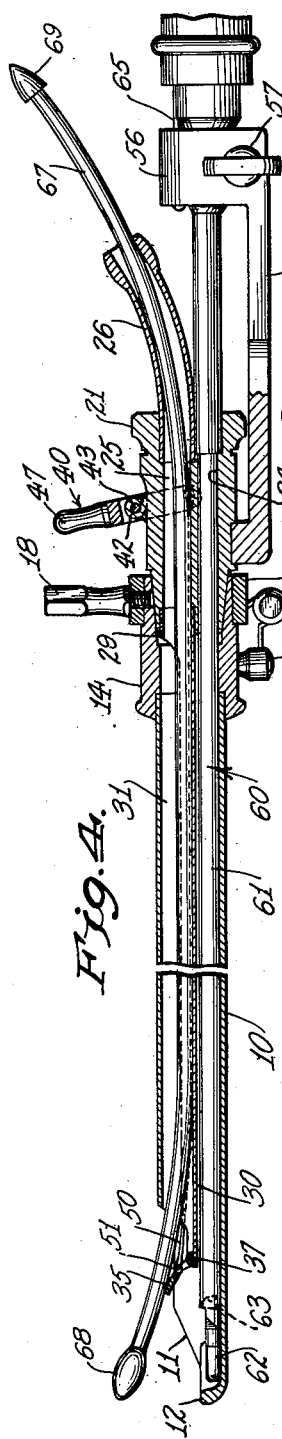
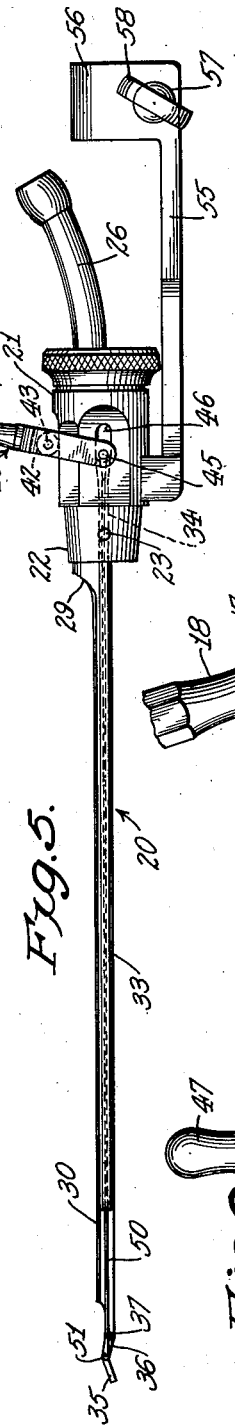
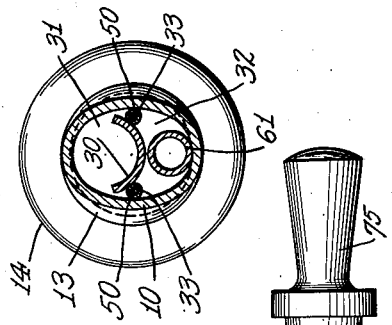
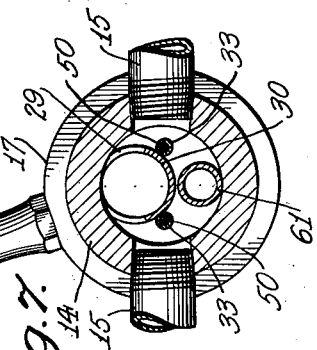
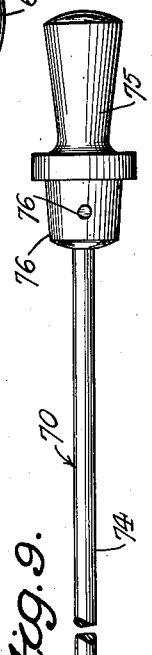
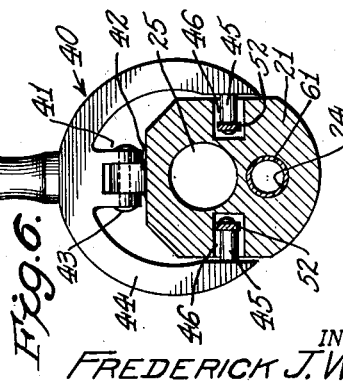
INVENTOR.
FREDERICK J. WALLACE
BY
F. J. Pisarra
ATTORNEY Patented May 10, 1949

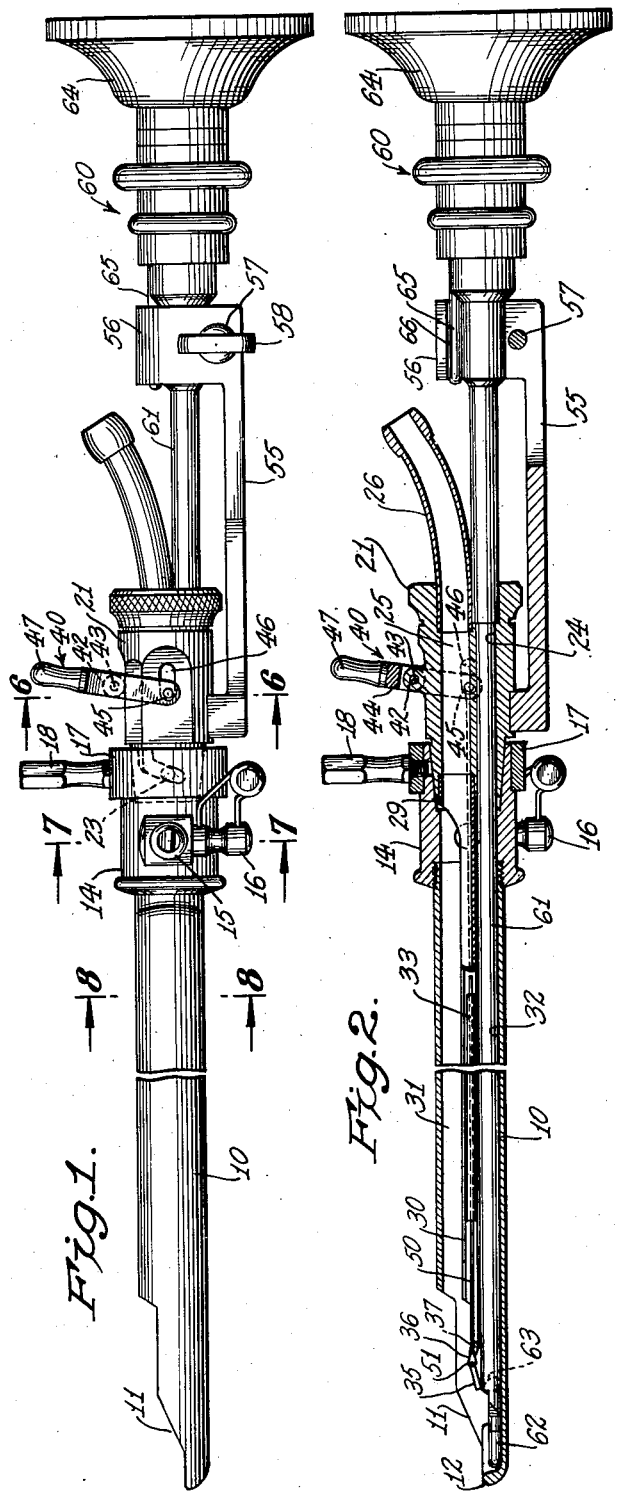
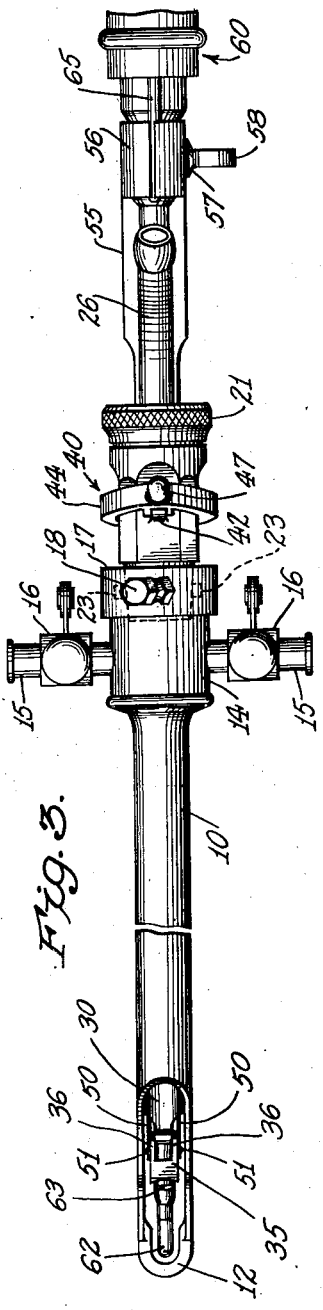

2,469,906

UNITED STATES PATENT OFFICE 2,469,906

URETHRAL DILATOR

Frederick J. Wallace, New York, N. Y., assignor to American Cystoscope Makers, Inc., New York, N. Y., a corporation of New York Application June 12, 1946, Serial No. 676,216

2 Claims. (Cl. 128—7)

This invention relates generally to surgical instruments and pertains, in one of its more specific aspects, to such instruments for readily and effectively dilating female ureters under conditions of water cystoscopy.

The practice heretofore in the dilation of female ureters has usually been by means of an open type of endoscopic tube containing a conventional lens system, the introduction of the dilating bougie into a urethral orifice being followed by direct vision. This procedure has been unsatisfactory for a number of reasons. For one thing, the field of vision, when using the devices hitherto known to the art, is very limited, making it extremely difficult for the operator to locate a urethral orifice. Also, many difficulties are encountered by the operator in directing the bougie into the urethral orifice and in effecting a proper dilation.

The generally known types of cystoscopes are not suited to urethral dilation procedures as they are not constructed so as to accommodate and direct the dilating tip of a dilating bougie to the required position for entry into a urethral orifice. Cystoscope sheaths must necessarily be of limited cross-sectional area, to the end that they may be introduced into body passages without causing undue discomfort to the patient and in order to minimize the possibility of shock and the danger of traumatization. The usual accessories carried within a cystoscopic sheath, including the surgical telescope, dividing fins, guides and other auxiliary devices, occupy so much space that there is not sufficient room to permit the successful passage of the dilating tip of a bougie à boule or similar instrumentality. For these reasons, cystoscopic instruments have not in the past been capable of being satisfactorily or successfully used in such operative procedures as the dilation of ureters.

The present invention contemplates a cystoscopic instrument that is adapted to be readily and advantageously employed with a conventional bougie à boule for the dilation of a ureter. The sheath of the instrument is of such size and the parts are so constructed and arranged as to permit the ready passage of a bougie à boule through the sheath and to facilitate manipulation of the bougie à boule so as to introduce the same into a urethral orifice under close and direct vision conditions.

The instrument comprises an endoscopic sheath, preferably oval in cross section and having an elongated lateral fenestra at its distal end. A member is adapted to be inserted into the sheath in a manner to divide the interior thereof into a first compartment, for the reception of a surgical telescope that carries a lamp for providing illumination, and a second compartment through which a bougie à boule or other instrumentality is adapted to be passed. Pivotally mounted at the foremost end of the dividing member is a deflector for directing the forward end of the bougie à boule through the sheath fenestra. The instrument includes valve control conduits for introducing and withdrawing irrigating liquids into and from the sheath.

One of the outstanding features of the invention resides in an improved and simplified mechanism for actuating the deflector. This mechanism includes a lever oscillatory about an axis normal to the axis of the sheath and having an operating handle and a pair of arms. A pair of rods pivotally connected at their opposite ends to the deflector and a corresponding arm of the lever is reciprocable through guiding means, including tubular guides carried by the dividing member on its telescope compartment side. The deflector rods and lever are so constructed and arranged that pivotal movement is imparted to the deflector in response to oscillatory movement of the lever.

As will be apparent from the detailed description that follows, taken in conjunction with the accompanying drawings, the various devices of the instrument of this invention are so arranged as to permit of their ready assembly, manipulation and dismantling, as may be required. The parts bear such relationship to each other as to obtain a relatively small compact unit having a passage (instrumentality compartment) of sufficient size to accommodate a bougie à boule or similar instrumentality and permit its manipulation under conditions of illuminated and adequate vision.

It is an important object of the invention to provide an instrument of the character indicated which is adapted to carry out various operative procedures within body cavities, such as the dilation of female ureters.

This invention has for another object the provision of a cystoscopic instrument so constructed and arranged as to permit the passage and manipulation of a flexible instrumentality, such as a bougie à boule.

Another object of the invention is to provide a deflector, for directing a flexible instrumentality through the fenestra of a cystoscopic instrument, with an actuating means of improved and simplified construction.

A further object of the invention is to provide an instrument for effectively dilating ureters under conditions of water cystoscopy and illuminated vision.

The invention has for a still further object the provision of an instrument of the type indicated that is relatively simple and compact in design, that is reasonable in original and maintenance costs, that may be readily assembled and dismantled without the use of tools; that has its parts so arranged as to be easily and separately sterilized; and that is capable of performing its intended functions in a satisfactory and trouble-free manner.

The foregoing objects, as well as other objects, together with the advantages attainable by the practice of this invention, will be readily understood by persons versed in the art upon reference to the following detailed description, taken in conjunction with the annexed drawings, that respectively describe and illustrate an arrangement of devices embodied in a preferred form of the invention.

In the drawings:

Figure 1 is a view in side elevation of an instrument constructed in accordance with this invention;

Figure 2 is a central longitudinal cross-sectional view of the instrument shown in Figure 1;

Figure 3 is a top plan view of the instrument illustrated in Figure 1 with parts omitted;

Figure 4 is a central longitudinal cross-sectional view similar to Figure 2 and illustrating certain parts in another relative position and showing a bougie à boule extending through the instrument;

Figure 5 is a side elevational view of one of the units of the instrument;

Figures 6, 7 and 8 are enlarged cross-sectional views taken along lines 6—6, 7—7 and 8—8, respectively, of Figure 1; and Figure 9 is a side elevational view of an obturator for use with the instrument at the time the instrument is inserted into a body passage.

Referring now more particularly to the drawings, wherein like reference characters denote corresponding parts throughout the several views, the instrument of this invention includes an oval endoscopic sheath 10 having an elongated lateral fenestra 11 at its forward end. The foremost edge portion of the fenestra is provided with a U-shaped thickened part 12 formed in the manner and for the purposes described in detail in Reinhold H. Wappler Patent 1,703,216 granted February 26, 1929, to which reference may be had. Sheath 10 has an integral rearward extension 13 that is circular in cross section (Figure 8) and externally threaded for engagement with corresponding internal threads in the forward end of a hollow coupling unit 14. This unit carries a pair of diametrically opposed nipples 15 for the transmission and withdrawal of irrigating liquid into and from the interior of sheath 10, as allowed by control valves 16. Secured to the rearward end of coupling unit 14 is a locking unit 17 that has a laterally extending operating handle 18 and that is preferably the same as or similar to the locking mechanism disclosed in Reinhold H. Wappler Patent 1,880,551 granted October 4, 1932, to which reference may be had for details of construction.

Turning next to Figure 5, I have illustrated therein a unitary assembly 20 that is adapted to be readily inserted into and moved along sheath 10 and removably connected to coupling unit 14 through the medium of locking unit 17. Assembly 20 comprises a body 21 having a frustro-conical forward portion 22 that carries a pair of laterally projecting locking pins 23. Within body 21 is a plurality of through longitudinal and preferably parallel passages including a telescope receiving passage 24 and a passage 25, communicating with a curved guide tube 26, for receiving an instrumentality, such as a bougie à boule or other flexible device.

Secured to body 21 and extending forwardly thereof is a tubular element 29 that is in axial alignment and communication with passage 25. The major portion of tubular element 29 is cut away longitudinally to obtain an arcuate member 30. When member 30 is inserted into sheath 10, and assembly 20 is coupled to unit 14 through the medium of locking unit 17 and locking pins 23, the parts above described assume the relative position illustrated in Figures 2, 7 and 8. At such times arcuate member 30 is disposed across and divides the interior of sheath 10 into an upper compartment 31 for the reception of a bougie à boule or other instrumentality and a lower compartment 32 for the reception of a telescope stem. Affixed to the under surface of arcuate member 30 and adapted to be positioned within telescope compartment 32 when the instrument is assembled, is a pair of spaced apart parallel guide tubes 33 which are coaxial with a pair of parallel passages 34 formed in body 21, one of which passages is indicated in Figure 5. A deflector 35, having a pair of integral legs 36, is pivotally connected to the forward extremity of arcuate member 30, as indicated at 37.

Reference is now had to Figure 6 for an understanding of the construction of a lever 40 and associated devices for actuating deflector 35. Lever 40 includes a depending bifurcated lug 41 adapted to receive an upstanding lug 42 carried by body 21 and pivotally coupled thereto by a pin 43. Lever 40 also includes a yoke 44 that carries a pair of lateral arms 45 that register with and ride in longitudinal external slots 46 formed in body 21. Extending upwardly of yoke 44 is an actuating handle 47. As will be apparent from an examination of Figures 2, 4 and 6, lever 40 is mounted for oscillation about an axis that is normal to the axes of passages 24 and 25 in body 21. A reach rod 50, reciprocable in each guide tube 33 and corresponding guide passage 34, is pivotally connected at its forward end 51 to deflector 35 and at its rearward end 52 to an arm 43 of lever 40 (Figure 6).

Rigidly attached to body 21 and projecting rearwardly thereof is a bridge 55 that carries a split clamping sleeve 56 that is in axial alignment with telescope receiving passage 24 in the body. A screw 57, having a wing head 58, effects clamping engagement and disengagement between split sleeve 56 and a surgical telescope, generally denoted by numeral 60. The surgical telescope preferably comprises a tubular stem 61 that carries an electric lamp 62 at its forward end, an objective lens 63 and a conventional eyepiece 64. The surgical telescope, including objective lens 63, may be the same as or similar to that disclosed in Reinhold H. Wappler et al. Patent 1,680,491 granted August 14, 1928, and is adapted to command an obliquely forward field of vision. Forwardly of eyepiece 64 is an aligning pin 65 arranged to be introduced into an aperture 66 in clamping sleeve 56.

The instrument above described is adapted to be advantageously employed with various types of instrumentalities including a double-ended urethral bougie à boule of the character shown in Figure 4 and comprising a flexible shank 67 of woven nylon or other suitable material which is provided with an "olive" tip 68 at one extremity and an "acorn" tip 69 at its other extremity. Either tip of the bougie à boule may be inserted into the instrument through guide tube 26 and passage 25 and moved forwardly along compartment 31 until it arrives in the region of fenestra 11. The operator may then direct the leading tip of the bougie à boule through fenestra 11 and to the desired location by actuating lever 40 from the position shown in Figure 2 to that shown in Figure 4 to thereby move reach rods 50 rearwardly and impart clockwise rotational movement to deflector 35. During this part of the procedure, the operator may observe the position of the leading end of the bougie à boule and its relationship to body cavities and passages by viewing the same through telescope 60 in the usual manner.

In Figure 9 there is illustrated an obturator 70 for use with endoscopic sheath 10 at the time the latter is being moved into a body passage. The obturator comprises a head 71 having a forwardly curved surface 72 and a recess 73. The recess accommodates thickened portion 12 at the front end of the sheath and permits the accurate positioning of obturator head 71 in fenestra 11. Curved surface 72 is of such configuration as to coact with the fenestrated portion of the sheath and present a smoothly rounded and freely insertable front end to the instrument. Attached to obturator head 71 is a shank 74 that is in turn connected to a handle 75 having a frustro-conical forward portion 76 carrying a pair of lateral pins 77 which coact with locking unit 17 to effect coupling engagement between the sheath and the obturator.

From the foregoing, it is thought that the construction, operation, and many advantages of the herein described invention will be apparent to those skilled in the art, without further description; and, it will be understood that various changes in the size, shape, proportion and minor details of construction may be resorted to without departing from the spirit, or sacrificing any of the advantages of the invention.

I claim:

1. In an instrument of the character described, a body, an endoscopic sheath connected to the body and having a lateral fenestra in its forward portion, a member dividing the interior of the sheath into a first compartment for the reception of a telescope and a second compartment for the reception of a flexible instrumentality, a deflector pivotally connected to the forward end of the member for directing an end of the instrumentality through the fenestra, rod means pivotally secured at one end to the deflector, a support mounted on the body, and oscillatory means including a lever pivotally connected to the support, said lever comprising a pair of arms and an actuating handle positioned intermediate the arms, and a pivotal connection between each arm and the other end of the rod means.

2. In an instrument of the character described, a body, an endoscopic sheath connected to the body and having a lateral fenestra in its forward portion, a member dividing the interior of the sheath into a first compartment for the reception of a telescope and a second compartment for the reception of a flexible instrumentality, a deflector pivotally connected to the forward end of the member for directing an end of the instrumentality through the fenestra, rod means pivotally secured at one end to the deflector, a support mounted on the body, and oscillatory means including a lever pivotally connected to the support, said lever comprising a pair of arms, each of the arms registering with and terminating in a corresponding external slot in the body, and an actuating handle positioned intermediate the arms, and a pivotal connection between each arm and the other end of the rod means.

FREDERICK J. WALLACE.

REFERENCES CITED

The following references are of record in the file of this patent:

UNITED STATES PATENTS

| Number | Name | Date |
|---|---|---|
| 1,901,731 | Buerger | Mar. 14, 1933 |

FOREIGN PATENTS

| Number | Country | Date |
|---|---|---|
| 532,236 | France | Nov. 10, 1921 |